US010364023B2

(12) United States Patent
Azzarello

(10) Patent No.: US 10,364,023 B2
(45) Date of Patent: Jul. 30, 2019

(54) AIRCRAFT PROVIDED WITH A BUOYANCY SYSTEM, AND A BUOYANCY METHOD

(71) Applicant: AIRBUS HELICOPTERS, Marignane (FR)

(72) Inventor: Julien Azzarello, Marseilles (FR)

(73) Assignee: AIRBUS HELICOPTERS, Marginane (FR)

(*) Notice: Subject to any disclaimer, the term of this patent is extended or adjusted under 35 U.S.C. 154(b) by 304 days.

(21) Appl. No.: 15/446,401

(22) Filed: Mar. 1, 2017

(65) Prior Publication Data

US 2017/0320563 A1 Nov. 9, 2017

(30) Foreign Application Priority Data

Mar. 3, 2016 (FR) ..................... 16 00364

(51) Int. Cl.
*B64C 25/56* (2006.01)
*B64C 25/32* (2006.01)

(52) U.S. Cl.
CPC ........ *B64C 25/56* (2013.01); *B64C 2025/325* (2013.01)

(58) Field of Classification Search
CPC ............................... B64C 25/56; B64C 25/54
See application file for complete search history.

(56) References Cited

U.S. PATENT DOCUMENTS

| 1,839,976 A | * | 1/1932 | Lutz | ........................ | B64C 25/06 |
| | | | | | 244/102 R |
| 2,702,171 A | * | 2/1955 | Katzenberger | .......... | B64C 25/54 |
| | | | | | 244/101 |
| 3,321,158 A | | 5/1967 | Stasi | | |
| 9,469,398 B2 | | 10/2016 | Dijaux | | |
| 9,533,757 B2 | | 1/2017 | DeLorme et al. | | |
| 2010/0044506 A1 | | 2/2010 | Smith et al. | | |
| 2013/0327890 A1 | | 12/2013 | Lyons | | |
| 2015/0217862 A1 | | 8/2015 | Dijaux | | |

FOREIGN PATENT DOCUMENTS

| FR | 699391 A | * | 2/1931 | ............. | B64C 25/10 |
| FR | 2994686 | | 2/2014 | | |
| FR | 3011817 | | 4/2015 | | |
| FR | 3017107 | | 8/2015 | | |
| JP | H0463800 | | 2/1992 | | |
| WO | WO-2017119546 A1 | * | 7/2017 | ............. | B64C 11/46 |

OTHER PUBLICATIONS

French Search Report for French Application No. FR 1600364, Completed by the French Patent Office dated Nov. 15, 2016, 7 Pages.

* cited by examiner

*Primary Examiner* — Brian M O'Hara
(74) *Attorney, Agent, or Firm* — Brooks Kushman P.C.

(57) ABSTRACT

An aircraft having an airframe that extends longitudinally along an anteroposterior plane. A buoyancy system is provided with at least one pair of two floats arranged transversely on opposite sides of said anteroposterior plane. Each float is movable in elevation from a bottom position to a top position. For each float, the buoyancy system includes a blocking system for blocking each float by default in the bottom position, and for acting under a predetermined condition to block the floats present on one of the sides only of the aircraft in the top position.

14 Claims, 7 Drawing Sheets

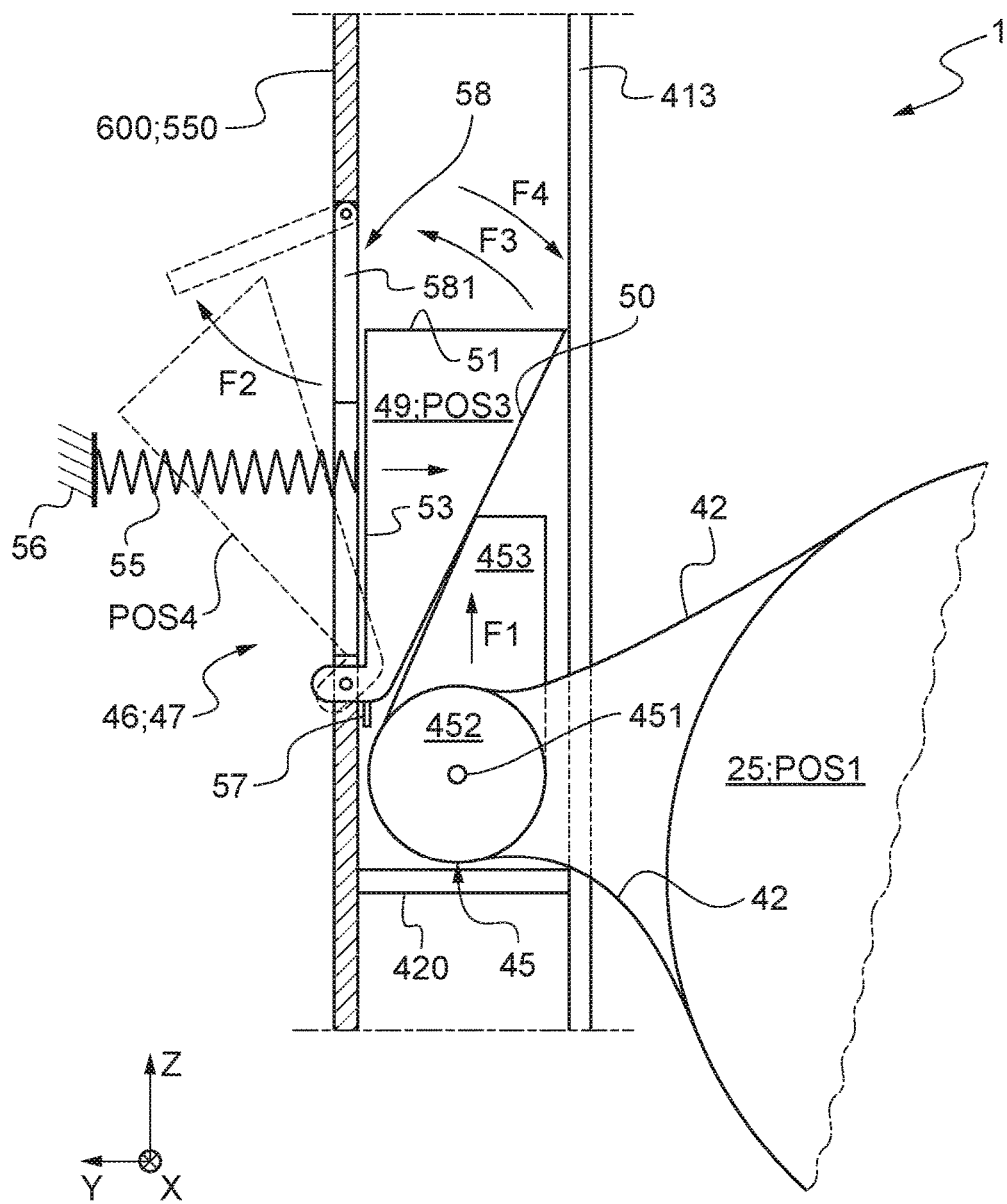

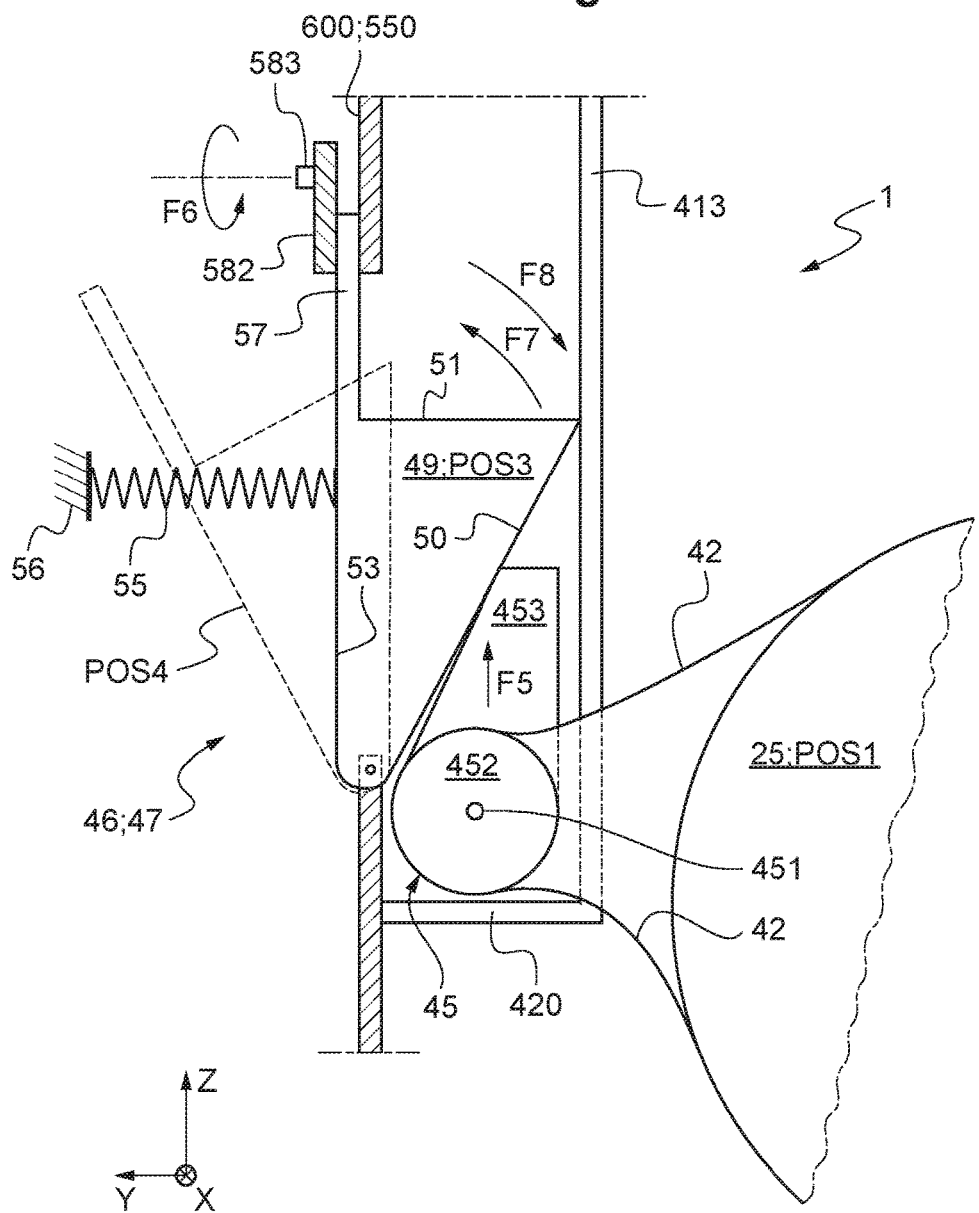

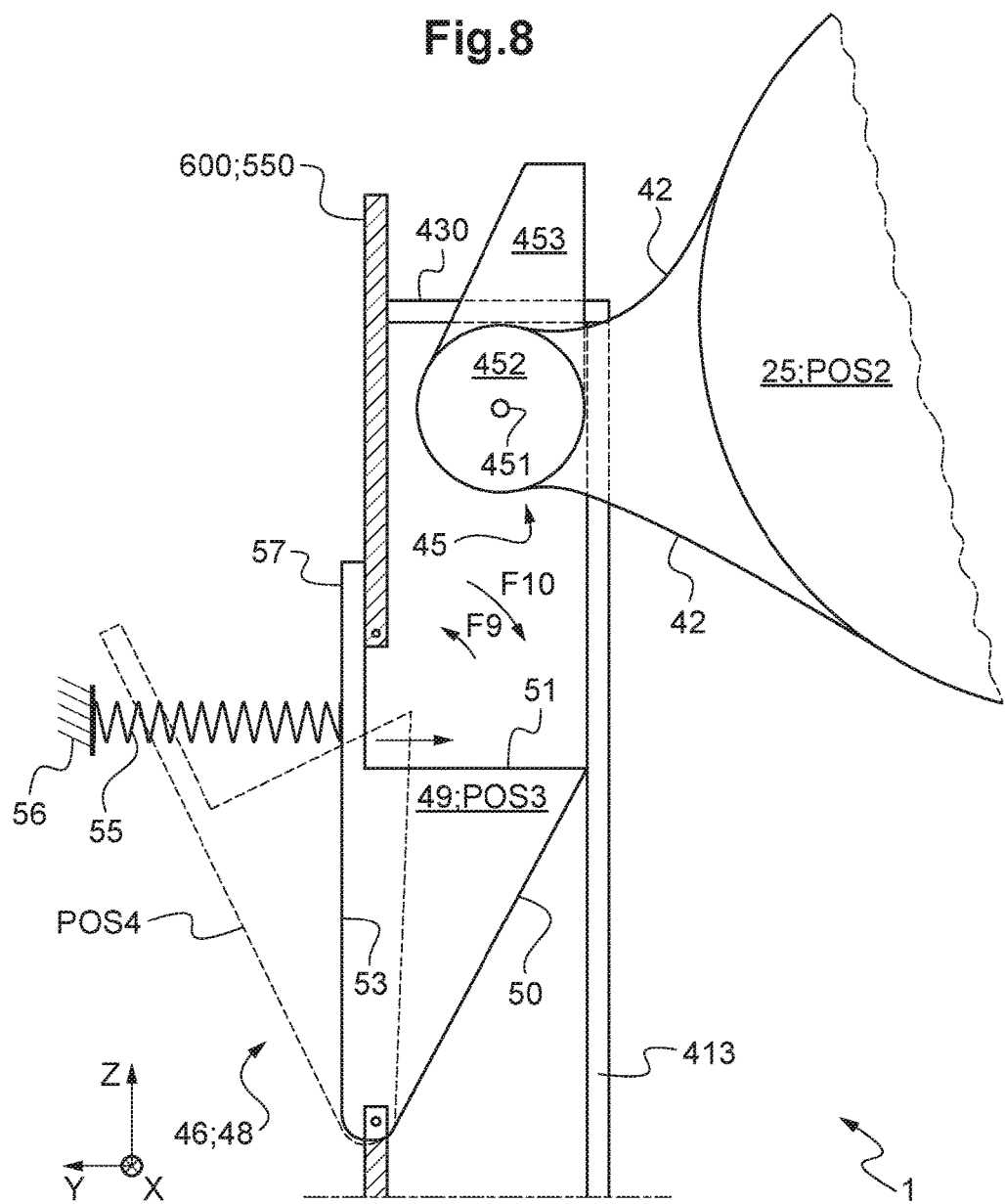

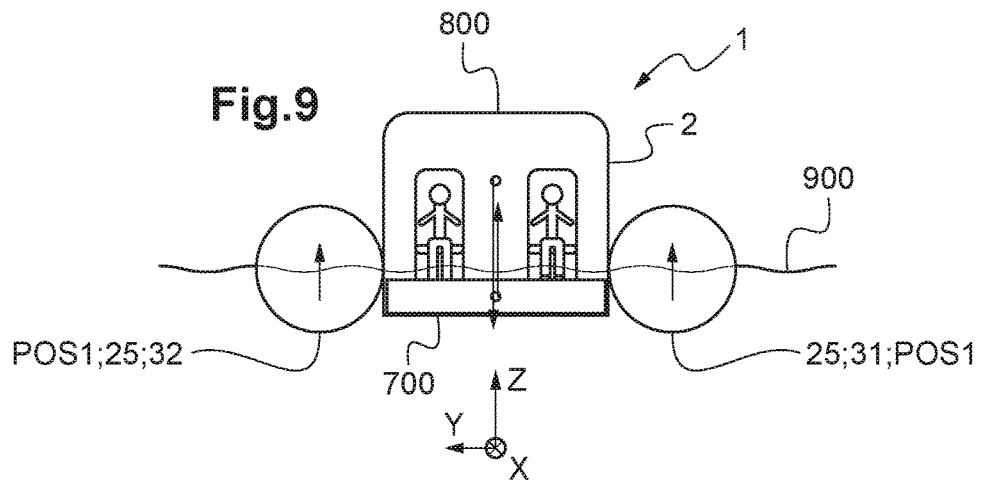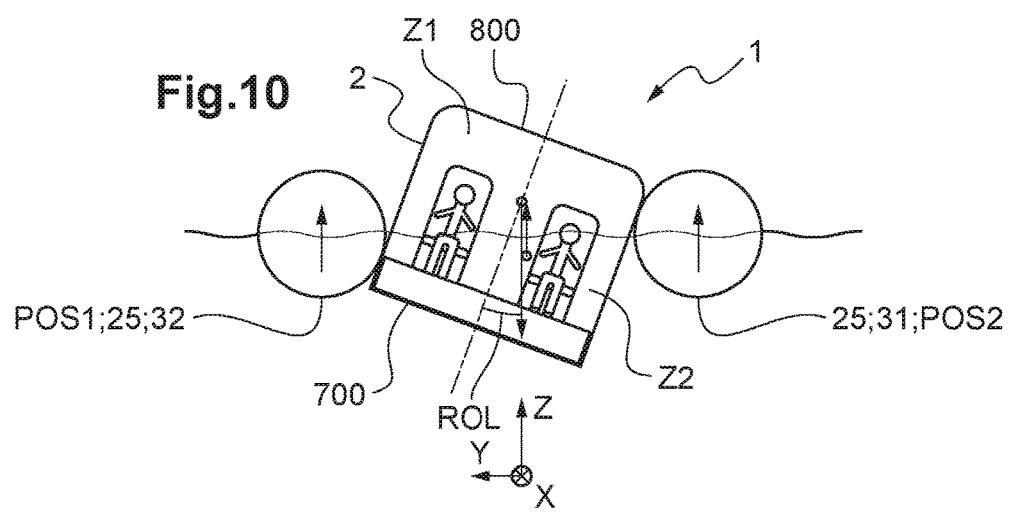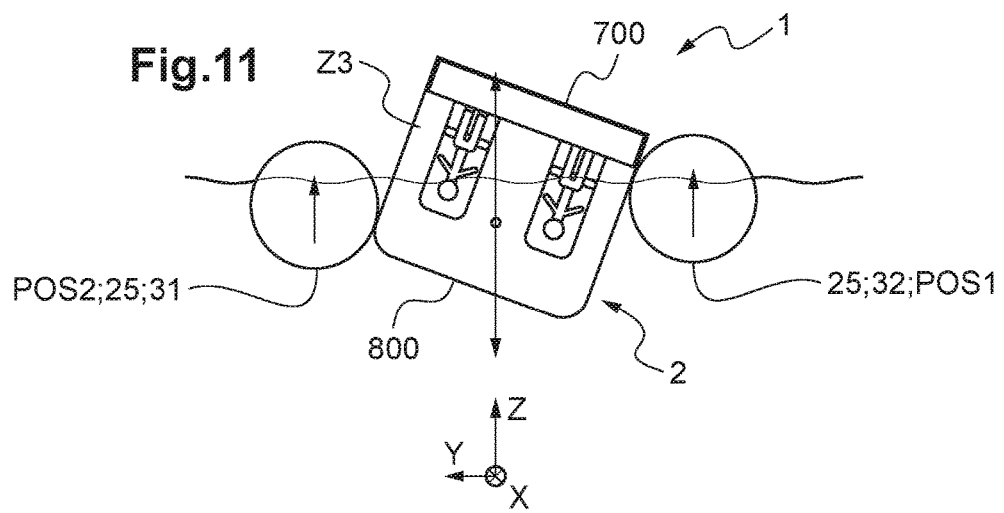

AIRCRAFT PROVIDED WITH A BUOYANCY SYSTEM, AND A BUOYANCY METHOD

CROSS REFERENCE TO RELATED APPLICATIONS

This application claims priority to French patent application No. FR 1600364 filed on Mar. 3, 2016, the disclosure of which is incorporated in its entirety by reference herein.

BACKGROUND OF THE INVENTION

(1) Field of the Invention

The present invention relates to an aircraft provided with a buoyancy system, and also to a buoyancy method.

Under such circumstances, the invention relates to the technical field of buoyancy systems for enabling an aircraft to ditch on water and to float in stable manner, and it relates more particularly to a rotary wing aircraft.

(2) Description of Related Art

Such a buoyancy system contributes to ensuring that an aircraft floats and is stable after ditching. By way of example, the buoyancy system may be used after forced ditching, in order to enable the occupants to evacuate the aircraft. In principle, all aircraft that are used for transporting people over areas of sea are provided with such a buoyancy system.

Aviation certification regulations also specify that an aircraft must be capable of ditching and of being stable on water when using its buoyancy system. That stability must continue to apply for states of the free surface of the water and for wind levels that are defined in those certification regulations.

Such states of the free surface of the water are also referred to as "sea states", and they apply to any liquid surface. The term "ditching" thus covers an aircraft coming down on a free water surface, whether on the sea, or on a lake, for example. Certification regulations require an aircraft to be stable in a specified sea state.

A buoyancy system may comprise floats.

The floats are fastened on both opposite sides of the airframe of the aircraft. The term "airframe" designates a portion of the aircraft housing a cockpit, and possibly also a cabin and a hold.

For example, the floats are fastened in a bottom portion of the aircraft. The floats may then optionally be fastened to landing gear for carrying the airframe, or indeed to an outside wall of the airframe.

Certain buoyancy systems comprise floats that are inflatable, and by way of example, those floats may be deployed under the control either by the pilot and/or a copilot, or else by automatic triggering, in particular due to one or more immersion sensors. By way of example, such floats may comprise bags that are inflated by deployment means.

Furthermore, floats may be paired in order to optimize the stability of the aircraft on water. Under such circumstances, the floats of a pair may be arranged on opposite sides of the airframe of the aircraft.

Such a buoyancy system gives satisfaction for ensuring that the aircraft is stable, in particular with a sea state of level 4.

However, on extremely rough sea presenting a sea state much greater than the sea state specified by certification regulations, or under the action of a wave of particularly great intensity, floats can be pushed under the surface of the liquid when the aircraft presents a roll angle that is very large.

If the center of gravity of the aircraft no longer lies in register with a gap between two floats of a pair of floats, the aircraft can capsize.

Document US 2013/0327890 describes a helicopter provided with floats carried by snub wings. Those floats are arranged substantially halfway up the helicopter, and in particular substantially halfway up the cabin, as shown in FIG. 2c of Document US 2013/0327890.

In order to limit the risks of capsizing, the floats may be connected to an airframe by stretchable means. Document US 2015/0217862 describes an aircraft of that type.

Document FR 2 994 686 proposes connecting floats to a fuselage by a connection device that allows each float to move transversely relative to the fuselage.

Documents FR 3 011 817 and FR 3 017 107 are also known.

Documents JP H04 63800, US 2010/044506, and U.S. Pat. No. 3,321,158 are also known.

BRIEF SUMMARY OF THE INVENTION

An object of the present invention is thus to propose an aircraft presenting optimized stability after ditching.

According to the invention, an aircraft is provided with an airframe that extends longitudinally along an anteroposterior plane, the airframe extending transversely from a left side to a right side and in elevation from a bottom to a top.

The aircraft has a buoyancy system, which buoyancy system is provided with at least one pair of two floats, with the two distinct floats of a pair being arranged transversely on opposite sides of the anteroposterior plane.

Each float is movable in elevation from a bottom position towards a top position, the center of gravity of each float being present in a top plane perpendicular to the anteroposterior plane when in the top position, and in a bottom plane when in the bottom position, the bottom plane being parallel to the top plane and being situated below the top plane when the aircraft presents a roll angle of zero, the buoyancy system including, for each float, a blocking system for blocking each float by default in the bottom position, and for blocking the floats present on one of the sides only of the aircraft in the top position, under a predetermined condition.

The term "under a predetermined condition" means that all of the floats present on the left side or all of the floats present on the right side are released in order to reach their top positions when a predetermined condition arises.

The term "blocking system" designates a system suitable for blocking each float in a bottom position or in a top position as a function of the predetermined condition.

The term "floats present on one of the sides only" makes reference to the floats present either on the left side of the aircraft or to the floats present on the right side of the aircraft.

Consequently, the aircraft has at least one pair of floats. The floats may be in the form of floats that are structural or of floats that are inflatable. With inflatable floats, the floats may be inflated before, during, or after ditching, by applying the usual deployment procedures.

Whatever the nature of the floats and the way in which they are inflated, if they need inflating, the floats are all maintained in their bottom positions following ditching. The aircraft then behaves afloat in substantially the same manner as a conventional aircraft. The aircraft is in a position referred to for convenience as the "conventional" position.

However, when the predetermined condition arises, the blocking system releases each of the floats present on the left side of the aircraft, or each of the floats present on the right side of the aircraft. The floats that are released by the blocking system are referred to for convenience as "released" floats. Each released float then moves so as to reach its top position. For example, buoyancy thrust exerts a force on each released float enabling the released float to move in elevation along the airframe.

The blocking system then blocks each released float in its top position so as to make the movement of the released float irreversible, at least without human intervention.

The movement of each float present on one of the sides of the aircraft causes the aircraft to tilt in the roll direction. The aircraft then slopes towards its side that carries the floats that have been released and that are in the top position.

The aircraft is thus in a position on water that is more stable, which position is referred to for convenience as its "maximum stability" position.

In addition, the movement of each released float takes place progressively. Consequently, the aircraft tilts from the conventional position towards the maximum stability position gently, thereby tending to limit stress for the occupants of the aircraft.

Furthermore, in the maximum stability position, the aircraft presents a roll angle that is not zero, but it is not completely upside-down. Consequently, part of the volume of the cabin occupied by people can remain out of the water so as to enable its occupants to breathe.

In order to take advantage of this aspect, the top position of each float may be designed so as to keep the head of each occupant sitting on a seat out of the water, at least for occupants of some minimum height and in the absence of capsizing.

In addition, even if the aircraft does overturn in the presence of a particularly severe sea state, the aircraft will continue to present an angle of inclination that tends to maintain a pocket of air within the cabin.

Moving each float that is present on only one of the sides of the aircraft is not obvious in any way. Specifically, this movement increases the roll angle of the aircraft, which appears to be unreasonable, given that a portion of the cabin is then underwater.

Nevertheless, the Applicant has observed that the stability of the aircraft on water is then at a maximum. Furthermore, this roll angle of inclination enables a portion of the cabin to be kept out of the water so that the occupants of the aircraft can breathe.

The aircraft may in particular include one or more of the following characteristics.

By way of example, the airframe extends in elevation from a bottom portion including the bottom, to a top portion including the top, and the bottom position is situated in the bottom portion of the aircraft and the top position is situated in the top portion of the aircraft.

Consequently, a float in its bottom position is then situated level with the bottom portion. When the roll angle of the aircraft is zero, the float is situated below a middle plane lying between the bottom portion and the top portion, the middle plane being a plane that is perpendicular to the anteroposterior plane and that is defined by a transverse axis and by an axis in elevation of the aircraft.

In contrast, the float is situated level with the top portion when it is in its top position. The float is then situated above the middle plane, for an aircraft presenting a roll angle of zero.

Furthermore, the buoyancy system may be provided for each float with at least one slide that is mounted to slide relative to a rail, each rail extending in elevation, from the bottom portion towards the top portion, each slide being attached to a corresponding float.

Each float is movable in elevation from a bottom position to a top position by each slide that is fastened to the float sliding along a rail.

The blocking system may then include latches for blocking a slide relative to the corresponding rail.

Each slide may be in the form of a fitting having at least one wheel that runs in a rail. The slide can then move along the rail in order to enable the float to move.

Optionally, the buoyancy system may be provided with two slides for each float, the slides being slidably mounted relative to two respective rails, each rail extending in elevation from the bottom portion to the top portion, each slide being attached to a corresponding float.

Under such circumstances, and by way of example, the rails may be installed in a door frame.

Furthermore, the blocking system may have at least one latch referred to as a "bottom" latch for holding a float in the bottom position, the blocking system including at least one latch referred to as a "top" latch for holding a float in the top position, the blocking system having a processor unit connected to an activation system, the processor unit controlling each bottom latch to allow a float to move from the bottom position towards the top position on request of the activation system, the top latch having the function of making the movement irreversible without manual action by a person on each top latch.

The term "processor unit" designates a calculator system suitable for controlling at least one latch in order to open or close the latch.

The term "activation system" designates a system suitable for generating a signal that is transmitted to the processor unit in order to indicate that at least one latch needs to be opened.

After ditching, the bottom latches hold each float in its bottom position.

As soon as a predetermined condition arises, the activation system sends a signal to the processor unit, which unit then opens the bottom latches present on one of the sides of the aircraft. Each float associated with an open latch is then released, and it moves towards its top position. At least one top latch then blocks the float in its top position.

In addition, a predetermined condition may arise as a result of a pilot giving an order for moving each of the floats present on one of the sides of the aircraft.

The term "pilot" should be understood broadly as referring to any person, e.g. a person present in the aircraft.

Under such circumstances, the activation system includes a control member operable by a pilot to enable a pilot to select between maintaining each float in its bottom position or allowing each of the floats present on one of the sides of the aircraft to move towards its top position.

A predetermined condition may arise as a result of the aircraft reaching a threshold roll angle. Under such circumstances, the activation system includes a measurement system for measuring a roll angle of the aircraft.

The measurement system communicates with the processor unit in order to request movement of at least one float as soon as a threshold roll angle is reached.

Furthermore, at least one latch may include a pivotable flap hinged to the airframe in order to pivot so as to project from a skin of the aircraft in a blocking position so as to block the float, or to be retracted at least in part into said skin in an unblocking position for unblocking the float.

Such a latch is found to be relatively simple and light in weight.

The pivotable flap may have a sloping face and a plane face, the sloping face presenting an acute first angle of inclination relative to a direction in which the float moves from the bottom position to the top position, the plane face presenting a second angle of inclination relative to the direction that is greater than the first angle of inclination.

The plane face may be substantially perpendicular to the travel direction.

In addition, a latch may include a spring exerting a force on the flap tending to hold the flap in the blocking position.

Furthermore, the flap may include an abutment for stopping pivoting of the flap from the unblocking position towards the blocking position once said blocking position has been reached.

In order to be capable of being opened on request from a pilot, a latch may also include an electric locking member co-operating by interfering shapes with the flap in order to prevent or to allow the flap to pivot on request of a processor unit.

By way of example, the locking member may comprise an electric opener plate or indeed a catch that can be moved by electrically operable means.

In another aspect, when the aircraft has windows, a float may be situated at least in part below a window in the bottom position and at least in part above the window in the top position in order to avoid totally masking said window.

The term "situated below a window" means that the float has a section projecting below the window so as to avoid completely masking the window. Likewise, the term "situated above the window", means that the float includes a section projecting above the window so as to avoid masking the window completely.

Consequently, the window is not completely masked by a float when the float is in its bottom position or in its top position. The window can then be used as an emergency exit.

In addition to an aircraft, the invention provides a method applied by the aircraft.

The invention thus provides a buoyancy method for causing an aircraft to float, the aircraft being provided with an airframe that extends longitudinally along an anteroposterior plane, said airframe extending transversely from a left side to a right side, and in elevation from a bottom to a top, the aircraft having a buoyancy system, the buoyancy system being provided with at least one pair of floats, two distinct floats of a pair being arranged transversely on opposite sides of said anteroposterior plane on the outside of the airframe.

According to the method, each float of a pair is made to be movable in elevation from a bottom position to a top position, each float being attached to at least one slide that is made to be slidable relative to a rail in order to enable the float to move from the bottom position to the top position;

each float is held by default in a bottom position; and when a predetermined condition occurs, all of the floats present on one of the sides only of the aircraft are placed in the top position.

In particular, it is possible for the floats present on one side only of the aircraft to be put into the top position on request of a pilot or when a roll angle of the aircraft reaches a predefined threshold.

Under calm sea conditions, the floats can remain in a bottom position.

BRIEF DESCRIPTION OF THE DRAWINGS

The invention and its advantages appear in greater detail from the context of the following description of examples given by way of illustration and with reference to the accompanying figures, in which:

FIGS. 6 to 8 are diagrams showing latches suitable for holding a float in a position; and FIGS. 9 to 11 are diagrams explaining the operation of the invention.

DETAILED DESCRIPTION OF THE INVENTION

It should be observed that three mutually orthogonal directions X, Y, and Z are shown in the figures.

The first direction X is said to be longitudinal. The term "longitudinal" relates to any direction that is substantially parallel to the first direction X.

The second direction Y is said to be transverse. The term "transverse" relates to any direction that is substantially parallel to the second direction Y.

Finally, the third direction Z is said to be in elevation. The term "in elevation" relates to any direction that is substantially parallel to the third direction Z.

Figure 1:
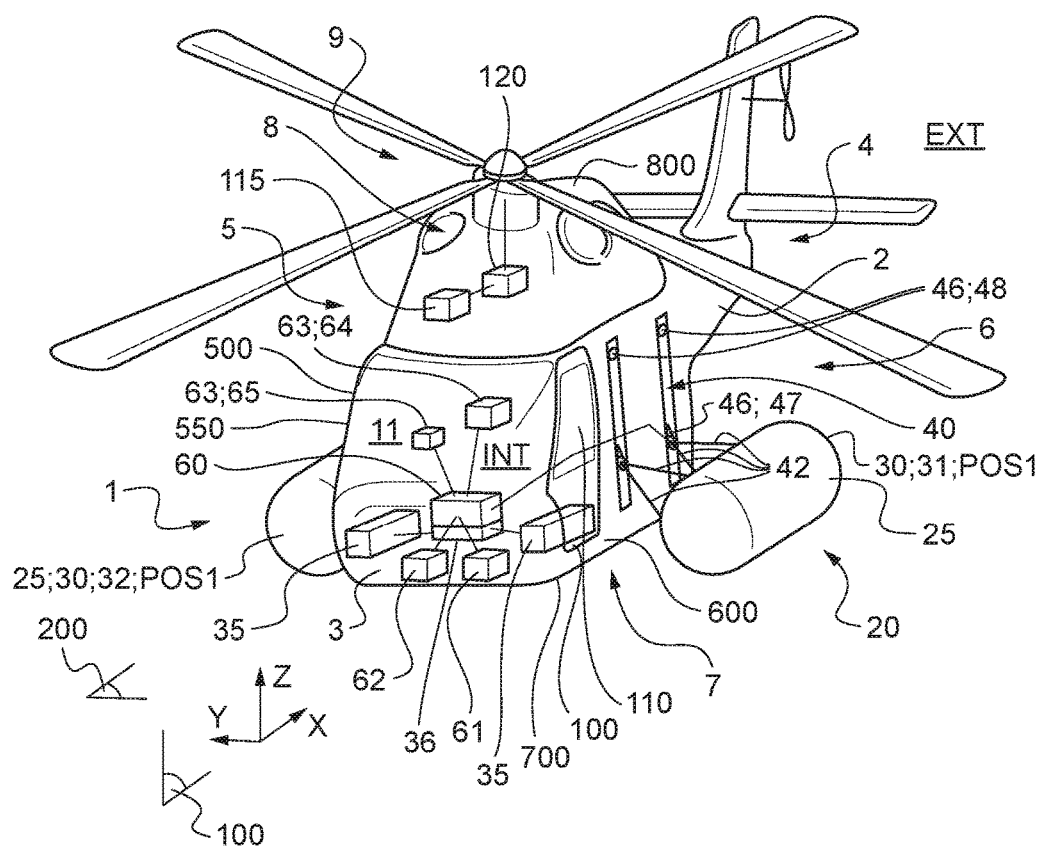
FIG. 1 is a diagram showing an aircraft provided with a buoyancy system of the invention.

FIG. 1 shows an aircraft 1. In particular, the aircraft may be a rotorcraft.

The aircraft 1 comprises an airframe 2 extending longitudinally from a front end 3 to a rear end 4 along an anteroposterior plane 100. The anteroposterior plane may optionally be a plane of symmetry of the aircraft.

Furthermore, the airframe 2 extends transversely from a left side 6 to a right side 5 on opposite sides of the anteroposterior plane 100 (where "left" and "right" should be relatively understood. Consequently, the airframe 2 has an outer skin referred to more simply as the "skin" 550 that embodies a left flank 600 of the airframe and a right flank 500 of the airframe.

In this context, the term "left" designates portions of the aircraft present on the left side 6 of the aircraft and the term "right" designates portions of the aircraft present on the right side 5 of the aircraft. The term "left" thus designates portions of the aircraft present on the left 6 of the anteroposterior plane 100, and the term "right" designates portions of the aircraft present on the right 5 of the anteroposterior plane 100.

Furthermore, the airframe extends in elevation from a bottom 700 of a bottom portion 7 of the airframe towards a top 800 of a top portion 8.

The bottom portion 7 is conventionally provided with landing gear, and the top portion 8 may carry a rotor 9 that contributes to providing the aircraft with lift and possibly also with propulsion. The bottom portion may include a bottom structure defined in particular by the floor of an inside space and by the skins of the airframe.

The top portion can thus carry a rotor 9 when the aircraft is a rotorcraft. The rotor 9 is rotated by at least one engine 115 via a main power transmission gearbox 120. The engine 115 may be a turboshaft engine having an expansion turbine secured to an outlet shaft, the outlet shaft being connected by a mechanical system to the main gearbox 120.

The bottom portion can then represent the bottom half of the airframe, while the top portion represents the top half of the airframe.

Furthermore, the inside INT of the airframe 2 comprises hollow spaces that are defined by the skin 550 and by various partitions. Each internal space thus represents a compartment that extends in particular in elevation from a base referred to as its "floor" for convenience, up to a ceiling. The ceiling of a compartment may constitute the floor of another compartment.

In addition, the aircraft 1 is also provided with a buoyancy system 20 of the invention in order to enable it to ditch on water.

Such a buoyancy system may include a system for blowing air into the airframe after ditching. Such a system may comprise at least one pump sucking in air from outside the aircraft in order to reinject that air into the airframe. The airframe may be air-tight, in particular in its bottom portion so as to constitute an air-tight pouch.

In addition, the buoyancy system 20 is provided with at least one pair of floats 25.

Each pair of floats comprises two floats 25 arranged transversely on either side of the airframe 2 of the aircraft. The floats 25 of a pair of floats are then arranged on opposite sides of the anteroposterior plane 100, and by way of example they are arranged on the outside EXT of the airframe 2. The term "arranged on the outside EXT of the airframe 2" means that the floats are deployed at least in part outside the airframe 2 after ditching.

A float 25, referred to as the "left float 31" is arranged on the left side 6 of the aircraft, while a float 25 referred to as the "right float 32" is arranged on the right side 5 of the aircraft.

The floats 25 in a pair may be arranged symmetrically on opposite sides of the anteroposterior plane 100 of symmetry of the aircraft when the aircraft is in a stable position.

For example, the aircraft may have one or indeed two pairs of floats 25.

Furthermore, each float 25 may comprise an envelope 30 that floats on water, the envelope holding gas captive, for example. The length of the envelope then represents a dimension of the envelope in a longitudinal direction, the width of the envelope represents a dimension of the envelope in a transverse direction, and the thickness of the envelope represents a dimension of the envelope in a direction in elevation.

The envelope 30 may be a structural envelope made of composite materials, metals, plastics materials, . . . .

Nevertheless, the envelope 30 may alternatively be an inflatable bag.

Under such circumstances, at least one float 25 is inflatable. It is possible for all of the floats 25 to be inflatable. Under such circumstances, the inflatable floats are deflated except during stages of ditching. In particular, prior to being inflated, the inflatable floats may be folded up inside a space provided for this purpose.

Under such conditions, the buoyancy system includes an inflation system for inflating each inflatable float. The inflation system has at least one inflater 35 for inflating the inflatable float. Each inflater may comprise an inflater that is electrical, explosive, pneumatic, chemical, . . . .

By way of non-exclusive example, an inflater 35 is connected to a plurality of floats 25. Conversely, FIG. 1 shows an inflation system comprising a plurality of inflaters 35. Optionally, the inflation system has at least one inflater 35 per float.

Reference may be made to the state of the art in order to find embodiments of inflatable floats and of systems for inflating such floats.

Furthermore, the buoyancy system is provided with at least one control system 36 for controlling the inflaters 35. The control system 36 is then connected to at least one inflater 35 in order to cause the floats 25 to be inflated.

The control systems 36 may be a conventional system.

Nevertheless, the control system may include a computer, e.g. having a processor, an integrated circuit, a programmable system, a logic circuit, these examples not limiting the scope to be given to the term "computer".

The computer may optionally be put into action by activation means 37 suitable for being operated by a person. The activation means may then include at least one position enabling the buoyancy system to be made active. Thus, the buoyancy system may be inhibited in some situations, e.g. while the aircraft is not overflying a liquid surface.

The computer can determine whether predetermined conditions for inflation are satisfied, and if so, it can activate the inflaters 35. For example, selector means 61 that can be controlled by a person serve to transmit an order to the computer for inflating external and/or internal floats. The term "selector means" may designate a button, a touch screen, voice control means, a keypad, or a pointer suitable for manipulating computer means, . . . .

Likewise, at least one immersion sensor 62 may serve to detect the presence of water, and where appropriate to transmit an order to the computer for inflating the floats.

Other known systems may be used for inflating the floats, e.g. as a function of the ground speed vector of the aircraft.

Independently of the nature of the floats, each float 25 is movable in elevation as a result of being fastened to a guide system extending in elevation.

The guide system of a float may be a system that serves optionally to guide the floats in turning and/or in translation.

The guide system of a float may thus be a system for guiding the float in translation that comprises at least one rail 41 fastened to a skin 550 of the airframe, each rail 41 co-operating with a slide 45. For example, each float 25 is then connected to at least one side 45 by straps 42 or by metal fittings, for example.

Under such circumstances, each float 25 can move in translation in elevation from a "bottom" position POS1 shown in FIG. 1 to a "top" position POS2 that is not shown in FIG. 1.

Figure 2:
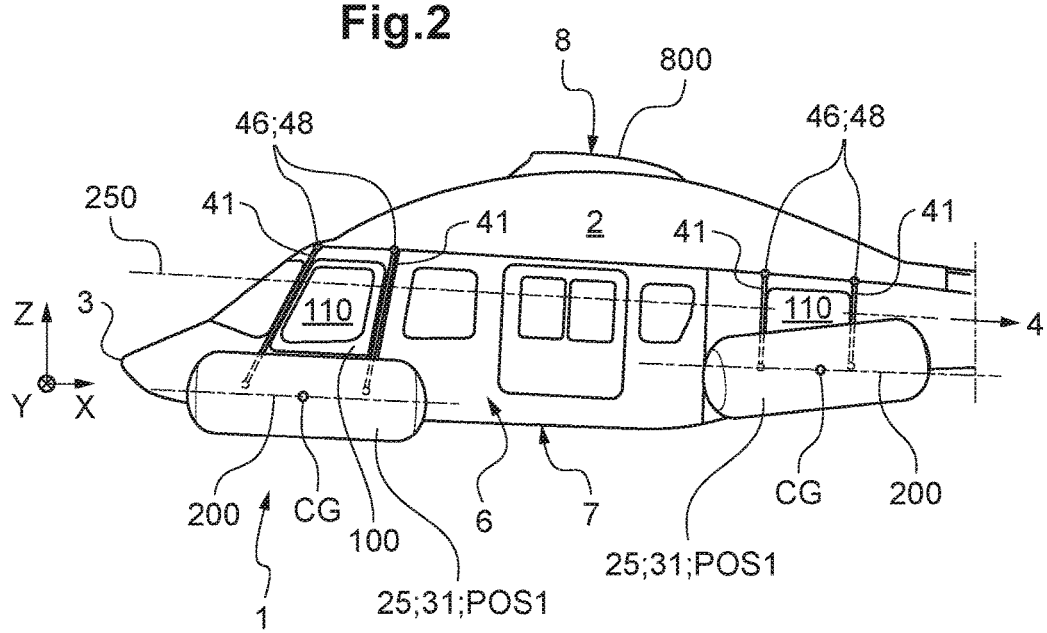
FIGS. 2 and 3 are diagrammatic side views of the aircraft respectively showing floats in a low position and in a high position.

FIG. 2 shows an aircraft provided with two pairs of floats. In FIG. 2, only the left floats 31 present on the left side 6 of the aircraft can be seen.

Each float 25 is then connected to the airframe by at least one slide that co-operates with a rail. In particular, FIG. 2 shows floats 25 connected to two slides engaged respectively with two rails 41. The two rails can then be arranged longitudinally on either side of the frames of doors or of windows 110.

In the bottom position POS1, each float presents a center of gravity CG that is located substantially in the bottom portion 7 of the aircraft. This center of gravity CG is then contained in a horizontal bottom plane 200 that is perpendicular to the anteroposterior plane 100 and to gravity when the aircraft is standing on the ground. Each bottom plane 200 is then situated under a middle plane 250 lying in elevation between the bottom portion 7 and the top portion 8.

In its bottom position POS1, a float 25 may optionally be situated at least in part under a window 110 in order to avoid masking the window.

Figure 3:
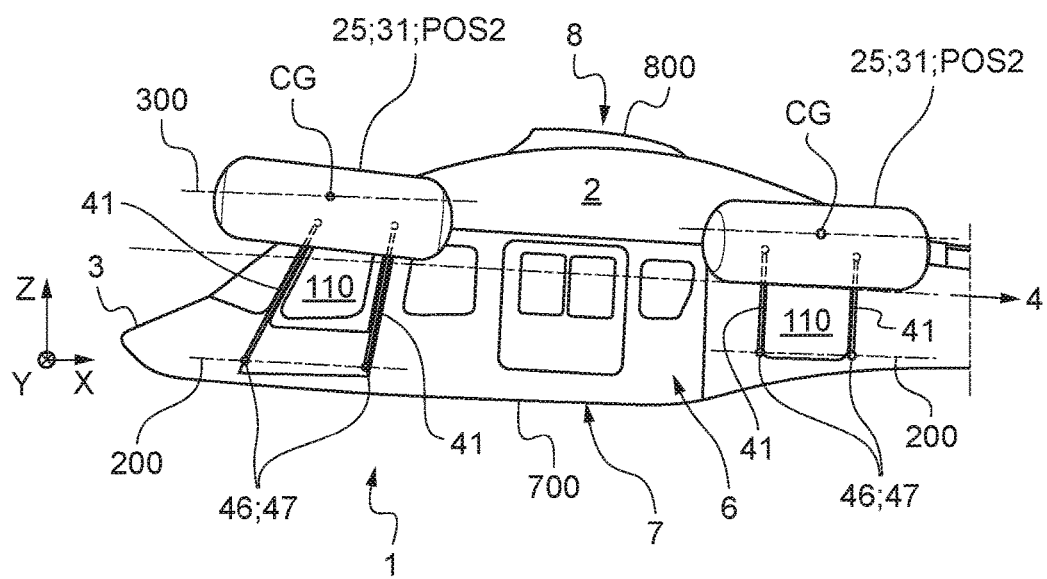

FIG. 3 shows floats 25 in their top positions POS2.

In the top position POS2, each float presents a center of gravity CG that is located substantially in the top portion 8 of the aircraft. This center of gravity is then contained in a horizontal top plane 300 parallel to the float's bottom plane 200. Under such circumstances, the top plane 300 lies above the bottom plane 200.

In its top position POS2, a float 25 may optionally be situated at least in part above a window 110 in order to avoid masking the window.

Consequently, the buoyancy system has floats that can move in translation from a bottom position POS1 to a top position POS2.

Nevertheless, the floats can move only under certain predetermined conditions.

Under such circumstances, and with reference to FIG. 1, the buoyancy system 20 includes a blocking system 40 for each float 25. The function of the blocking system 40 is to block each float 25 by default in its bottom position POS1. Furthermore, the function of the blocking system 40 is to unblock each float present on one of the sides of the aircraft 1 under a predetermined condition for the purpose of blocking the float in its top position POS2.

When the predetermined condition arises, each left float 31 or else each right float 32 is then released in order to reach its top position POS2.

With reference to FIG. 1, the blocking system 40 comprises, for each rail 41, a latch 46 referred to as a "bottom" latch 47 for the purpose of holding the float 25 in its bottom position POS1. Each bottom latch 47 can be operated remotely in order to be locked in a blocking position and to be unblocked.

Likewise, the blocking system 40 has at least one latch 46 referred to as a "top" latch 48 that is to hold a float 25 in the top position POS2.

In addition, the blocking system 40 has a processor unit 60 connected to an activation system 63. The processor unit 60 then communicates with each bottom latch 47 in order to enable a float 25 to move from the bottom position POS1 to the top position POS2 on request of the activation system 63.

This movement is irreversible, unless manual action is taken by a person on each top latch 48.

Under such circumstances, the processor unit 60 may possess by way of example: a processor; an integrated circuit; a programmable system; a logic circuit; these examples not limiting the scope given to the term "processor unit".

The above-mentioned processor unit 60 and control system 36 may constitute a single electronic unit. Such an electronic unit may have at least one processor or the equivalent together with a memory, code segments stored in the memory belonging to the processor unit, and code segments stored in the memory.

Furthermore, the activation system 63 may include a control member 64 that is operable by a pilot and that is connected to the processor unit 60. The control member 64 enables a pilot either to maintain each float 25 in its bottom position POS1, or to enable each float 25 present on one of the sides of the aircraft 1 to move towards its top position POS2.

By way of example, the control member 64 is a three-position rotary knob enabling the floats to be maintained in their bottom positions, enabling the left floats to move into their top positions, or enabling the right floats to move into their top positions.

Operation of the control member 64 then constitutes a predetermined condition for enabling some of the floats to move in translation.

Alternatively, or in addition, the activation system 63 may include a measurement system 65 serving to measure a roll angle ROL of the aircraft 1. The measurement system 65 may include an inclinometer or indeed an inertial unit, for example.

The measurement system 65 then transmits a signal representative of this roll angle to the processor unit.

If a high or low threshold roll angle is reached, then the processor unit can allow some of the floats to move in translation.

Detecting the presence of such a roll angle then constitutes a predetermined condition enabling some of the floats to move in translation.

FIGS. 4 to 8 show details of the embodiment of a blocking system 40.

Figure 4:
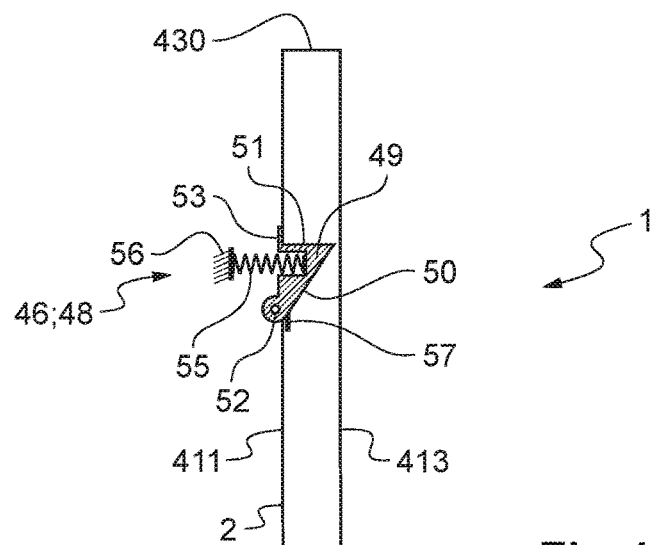
FIGS. 4 and 5 are views showing a float co-operating with a slide and a rail.
Figure 4:
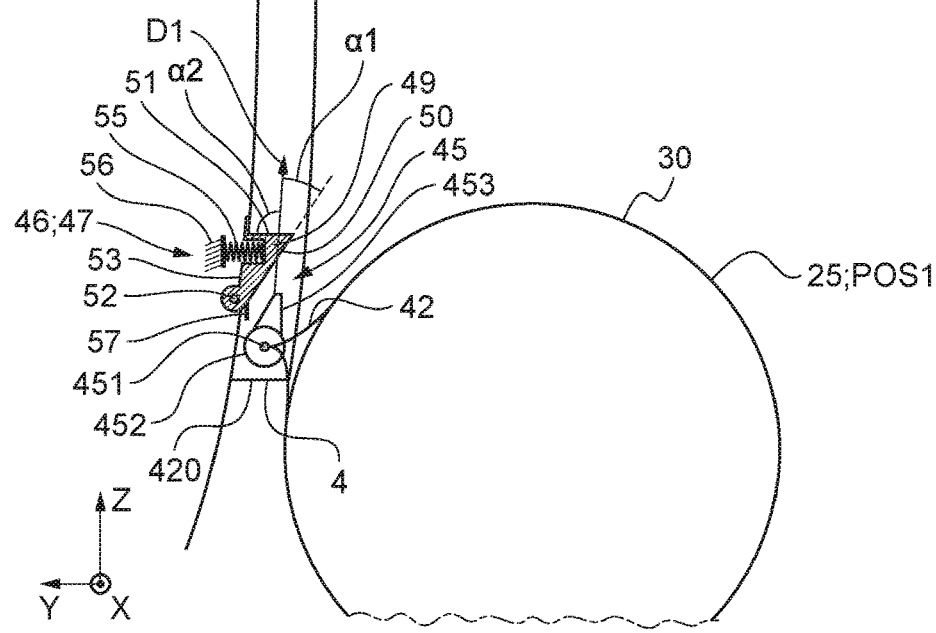

With reference to FIG. 4, a float 25 is connected to the airframe 2 by at least one rail 41. The envelope 30 of the float 25 is then fastened to a slide 45 by straps 42.

Figure 5:
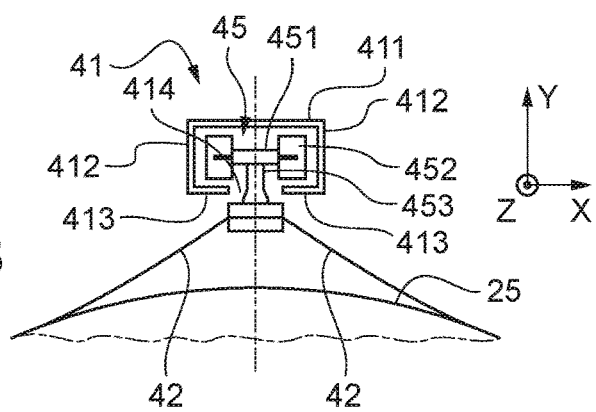

With reference to FIG. 5, a rail 41 may be a channel-section rail. Such a rail presents a web 411 secured to the airframe. Furthermore, the rail has two side flanges 412, each projecting from the web 411 in order to reach a rim 413. The two rims 413 are substantially parallel to the web, and they are spaced apart from each other by an empty space 414.

The slide 45 then comprises a rod 451 carrying at least one wheel 452, and possibly also the straps 42. By way of example, the rod 451 has two wheels 452, each wheel 452 being arranged transversely between the web 411 and a rim 413. The slide also has a contact plate 453 secured to the rod 451 in order to co-operate with each latch by interfering shapes.

With reference to FIG. 4, the rail also has a bottom abutment wall 420 blocking downward movement in translation of the slide 45, and a top abutment wall 430 blocking upward movement in translation of the slide 45.

Furthermore, a latch 46 referred to as the "bottom" latch 47 and a latch referred to as the "top" latch 48 are arranged in the rail or in the proximity of the rail in order to block the slide respectively in a bottom position or in a top position.

At least one latch 46, and possibly each latch 46 of a blocking system, includes a flap 49. The flap can pivot about a longitudinal axis relative to the skin of the airframe. Thus, each flap can pivot so as to project from a skin 550 of the aircraft 1 in a blocking position POS3 as shown in FIG. 4 so as to block the float 25, or so as to be retracted at least in part into the skin 550 in an unblocking position so as to unblock the float.

The flap 49 comprises a plate or the equivalent that is substantially triangular in shape.

The flap is then provided with a vertical face 53, a sloping face 50, and a plane face 51. The flap is also hinged to the airframe via a hinge 52 present at the junction between its vertical face and its sloping face.

The sloping face 50 has an acute first angle of inclination $\alpha 1$ relative to a travel direction D1 in which the float 25 travels. Under such circumstances, the plane face 51 presents a second angle of inclination $\alpha 2$ relative to the travel direction D1 that is greater than the first angle of inclination α1. For example, the second angle of inclination is substantially equal to 90 degrees when the flap projects out from the skin.

The first angle of inclination of the sloping face then serves to cause the flap to pivot by its shape interfering with the slide when a predetermined condition is satisfied. Conversely, the second angle of inclination tends to prevent the slide from returning back to its initial position.

Furthermore, the latch 46 has a spring 55 exerting a force on the flap 49 tending to hold the flap 49 in the blocking position POS3. This spring may extend between a stationary partition 56 of the aircraft and the vertical face 53 of the flap.

Furthermore, the flap 49 may possess an abutment 57 to stop pivoting of the flap 49 from the unblocking position to the blocking position POS3 once the blocking position POS3 has been reached. By way of example, the abutment may come into contact for this purpose with the web of the rail, a rim of the rail, or with the skin 550 of the airframe.

Furthermore, a latch 46 and in particular a bottom latch 47 may include an electrical locking member 58. By way of example, the locking member is connected to the processor unit 60 in order to prevent or allow the flap 49 to pivot.

FIGS. 6 and 7 show embodiments of a bottom latch 46.

In the embodiment of FIG. 6, the locking member is in the form of an electric opener plate 581 that can pivot. The electric opener plate is thus hinged to the skin 550 of the airframe.

After ditching, the thrust exerted by water on the float tends to cause the slide to move in translation along arrow F1. The slide then comes into contact with the sloping face of the flap 49.

Nevertheless, while in the position shown in continuous lines, the electric opener plate prevents the flap from pivoting. The flap is thus held in its blocking position.

Consequently, when the slide and the float 25 are in their bottom positions, the slide is blocked between the bottom abutment wall 420 and the flap of the bottom latch 47.

If a predetermined condition occurs, then the processor unit allows the electric opener plate to pivot, e.g. by powering this electric opener plate electrically.

Consequently, the electric opener plate 581 pivots F2 as a result of the force exerted by the flap on this plate. The flap simultaneously pivots F3 so as to reach the unblocking position POS4 that is drawn in dashed lines, thereby compressing the spring 55. The flap is thus retracted at least in part into the airframe.

Under such circumstances, the flap no longer impedes movement in translation of the slide 45. The slide 45 and the float 25 then move in translation along the rail 41.

When the slide is no longer in contact with the flap, the spring 55 exerts a force on the flap that tends to return the flap into its blocking position POS3 by performing a pivoting movement F4. Regardless of the freedom of movement available to the electric opener plate, the slide can no longer return to its bottom position, at least not without human intervention.

In the embodiment of FIG. 7, the locking member is in the form of a catch 582 that can be turned. The catch 582 is then carried by a motor 583 secured to the skin 550 of the airframe, for example.

The function of the catch is to hold an abutment 57 of the flap, e.g. against the skin 550 of the airframe.

After ditching, the thrust exerted by water on the float tends to cause the slide to move in translation along arrow F5. The slide then comes into contact with the sloping face 50 of the flap.

Nevertheless, in the position drawn in continuous lines, the catch 582 prevents the flap from pivoting. The flap is thus held in its blocking position POS3.

Consequently, while the slide and the float 25 are in their bottom positions, the slide is blocked between the bottom abutment wall 420 and the flap of the bottom latch 47.

If a predetermined condition arises, then the processor unit orders the catch 582 to turn F6, e.g. by electrically powering the motor 583.

Simultaneously, the flap pivots F7 so as to reach the unblocking position POS4 drawn in dashed lines, thereby compressing the spring 55. The flap is thus retracted at least in part into the airframe.

Under such circumstances, the flap no longer impedes movement in translation of the slide. The slide and the float 25 then move in translation along the rail 41.

When the slide is no longer in contact with the flap, the spring 55 exerts a force on the flap tending to return the flap to its blocking position POS3 by performing pivoting F8. The slide can no longer return to the bottom position, at least not without human intervention.

Independently of the embodiment of the bottom latch, when the slide is released by the bottom latch, the buoyancy thrust acting on the float, and the sinking of the aircraft into the water, act together to cause the slide to move along the rail.

With reference to FIG. 8, the slide 45 then reaches the top latch 48.

The slide 45 then exerts a force on the flap 49 of the top latch 48. The flap 49 pivots F9 so as to reach the unblocking position POS4 as drawn in dashed lines, while compressing the spring 55. The flap 49 is thus retracted at least in part into the airframe.

Under such circumstances, the flap 49 no longer impedes movement in translation of the slide. The slide and the float 25 then move in translation along the rail 41 until reaching the top abutment wall 430.

When the slide 45 is no longer in contact with the flap 49, the spring 55 exerts a force on the flap 49 tending to return the flap into its blocking position POS3 by performing pivoting F10. The slide can then no longer return to its bottom position, at least not without human intervention on the flap 49.

FIGS. 9 to 11 illustrate the method performed by the invention.

With reference to FIG. 9, when an aircraft 1 ditches on a liquid surface 900, the floats 25 are deployed in order to keep the aircraft 1 afloat.

With inflatable floats, the floats 25 may be inflated, either in flight prior to ditching, or else after ditching.

Each float 25 is then in its bottom position POS1.

By way of example, and with reference to FIG. 10, if the sea is rough, the activation system may cause each float on one of the sides of the aircraft to move towards its top position.

For example, the pilot or a roll angle measurement system may act to give rise to such a movement.

In the example of FIG. 10, each left float 31 has been reached in order to allow it to move towards its top position.

The movement of the left floats causes the roll angle ROL of the aircraft to increase, even though this appears to be unreasonable, since a portion of the cabin Z2 is then underwater.

Nevertheless, the Applicant has observed that the stability of the aircraft on the water is then maximized.

Furthermore, this roll angle of inclination enables a zone Z1 of the cabin to be kept out of the water.

With reference to FIG. 11, if the aircraft overturns, the aircraft can still present good stability. In addition, a portion Z3 of the cabin is still out of the water. The occupants of the aircraft can then detach themselves from their seats in order to be able to breathe.

Naturally, the present invention may be subjected to numerous variations as to its implementation. Although several embodiments are described, it will readily be understood that it is not conceivable to identify exhaustively all possible embodiments. It is naturally possible to envisage replacing any of the means described by equivalent means without going beyond the ambit of the present invention.

For example, the figures show an aircraft having left and right floats that are capable of moving in translation. Nevertheless, in a variant, it is possible for there to be movable floats on only one side. This variant tends to reduce the weight of the aircraft.

What is claimed is:

1. An aircraft having an airframe that extends longitudinally along an anteroposterior plane, the airframe extending transversely from a left side to a right side, and in elevation from a bottom to a top, the aircraft having a buoyancy system, the buoyancy system being provided with at least one pair of two floats, two distinct floats of a pair being arranged transversely on opposite sides of the anteroposterior plane, wherein the buoyancy system is provided for each float with at least one slide mounted to slide relative to a rail, each rail extending in elevation along a skin of the airframe, each slide being attached to a corresponding float, each float is movable in elevation from a bottom position to a top position by each slide sliding along a rail, each float presenting a center of gravity present in a top plane perpendicular to the anteroposterior plane when in the top position, and in a bottom plane when in the bottom position, the bottom plane being parallel to the top plane and being situated below the top plane when the aircraft presents a roll angle of zero, the buoyancy system including, for each float a blocking system for blocking each float by default in the bottom position, and for only blocking the floats present on one of the sides of the aircraft in the top position under a predetermined condition.

2. The aircraft according to claim 1, wherein the airframe extends in elevation from a bottom portion having the bottom to a top portion having the top, and the bottom position is situated in a bottom portion of the aircraft, the top position being situated in the top portion of the aircraft.

3. The aircraft according to claim 1, wherein the buoyancy system is provided for each float with two slides mounted to slide relative to two respective rails, each rail extending in elevation, each slide being attached to a corresponding float.

4. The aircraft according to claim 1, wherein the blocking system has at least one bottom latch for holding the associated float in the bottom position, the blocking system including at least one top latch for holding the float in the top position, the blocking system having a processor unit connected to an activation system, the processor unit controlling at least each bottom latch to allow the float to move from the bottom position towards the top position on request of the activation system, the top latch having the function of making the movement irreversible without manual action by a person on each top latch.

5. The aircraft according to claim 4, wherein the activation system includes a control member operable by a pilot to enable the pilot to select between maintaining each float in its bottom position or allowing each of the floats present on a single side of the aircraft to move towards its top position.

6. The aircraft according to claim 4, wherein the activation system includes a measurement system that measures the roll angle of the aircraft.

7. The aircraft according to claim 4, wherein at least one of the top and bottom latches includes a pivotable flap hinged to the airframe in order to pivot so as to project from the skin of the aircraft in a blocking position so as to block the float, or to be retracted at least in part into the skin in an unblocking position for unblocking the float.

8. The aircraft according to claim 7, wherein the pivotable flap has a sloping face and a plane face, the sloping face presenting an acute first angle of inclination ($\alpha 1$) relative to a travel direction in which the float moves from the bottom position to the top position, the plane face presenting a second angle of inclination ($\alpha 2$) relative to the travel direction that is greater than the first angle of inclination ($\alpha 1$).

9. The aircraft according to claim 7, wherein the latch includes a spring exerting a force on the flap tending to hold the flap in the blocking position.

10. The aircraft according to claim 7, wherein the flap includes an abutment for stopping pivoting of the flap from the unblocking position towards the blocking position once the blocking position has been reached.

11. The aircraft according to claim 7, wherein the latch includes an electric locking member co-operating by interfering shapes with the flap in order to prevent or to allow the flap to pivot on request of the processor unit.

12. The aircraft according to claim 1, wherein the aircraft includes windows, and a float is situated at least in part below a window in the bottom position and at least in part above the window in the top position in order to avoid totally masking the window.

13. A buoyancy method for causing an aircraft to float, the aircraft being provided with an airframe that extends longitudinally along an anteroposterior plane, the airframe extending transversely from a left side to a right side, and in elevation from a bottom to a top, the aircraft having a buoyancy system, the buoyancy system being provided with at least one pair of floats, two distinct floats of a pair being arranged transversely on opposite sides of the anteroposterior plane on the outside of the airframe, wherein:
   each float of a pair is made to be movable in elevation from a bottom position to a top position, each float being attached to at least one slide that is made to be slidable relative to a rail along a skin of the aircraft in order to enable the float to move from the bottom position to the top position;
   each float is held by default in a bottom position; and
   when a predetermined condition occurs, all of the floats present only on one of the sides of the aircraft are placed in the top position.

14. The buoyancy method according to claim 13, wherein the floats only present on one side of the aircraft are put into the top position on request of a pilot or when a roll angle of the aircraft reaches a predefined threshold.

* * * * *